No. 790,254. PATENTED MAY 16, 1905.
P. HANNAGAN.
CESSPOOL OR CATCH BASIN FOR SEWERS.
APPLICATION FILED JUNE 27, 1904.

3 SHEETS—SHEET 1.

Witnesses.
Oscar F. Hill
Edith J. Anderson.

Inventor:
Paul Hannagan
by Macleod Calvert & Randall
Attorneys.

No. 790,254. PATENTED MAY 16, 1905.
P. HANNAGAN.
CESSPOOL OR CATCH BASIN FOR SEWERS.
APPLICATION FILED JUNE 27, 1904.
3 SHEETS—SHEET 2.
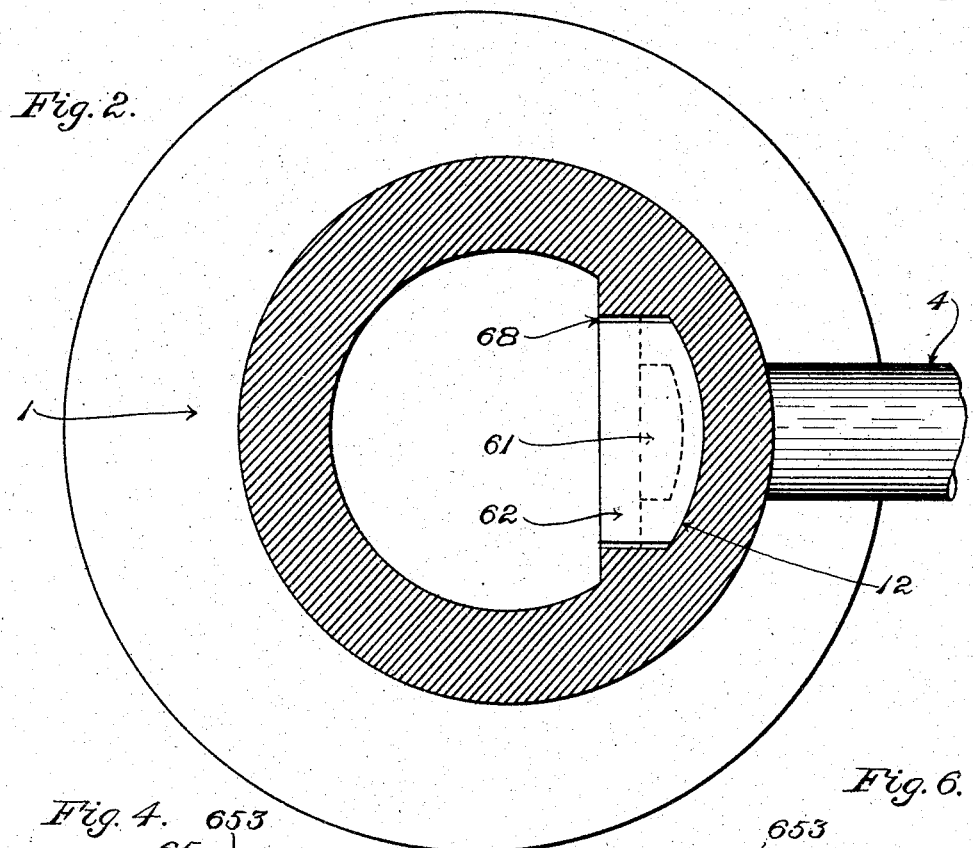
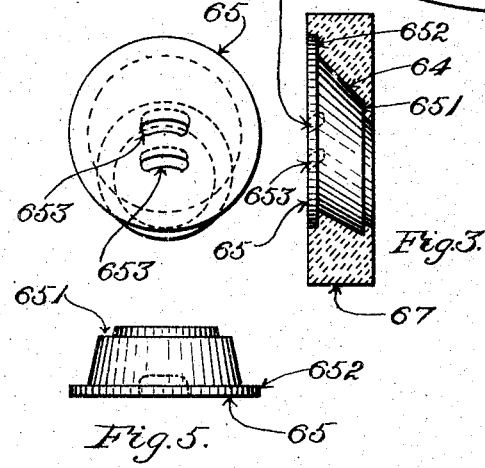
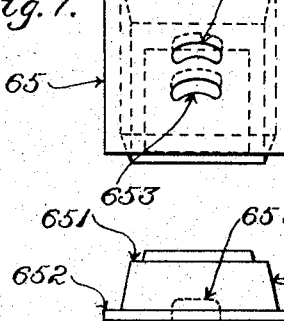
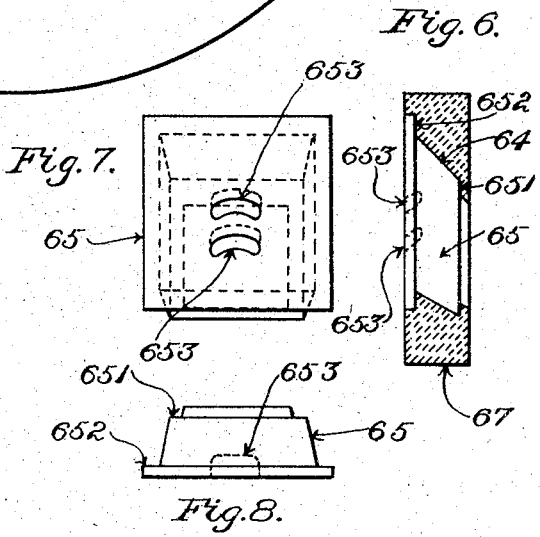
Witnesses:
Oscar F. Hill
Edith J. Anderson
Inventor:
Paul Hannagan
By Macleod Calver & Randal
Attorneys.

No. 790,254. PATENTED MAY 16, 1905.
P. HANNAGAN.
CESSPOOL OR CATCH BASIN FOR SEWERS.
APPLICATION FILED JUNE 27, 1904.

3 SHEETS—SHEET 3.

Witnesses:
Oscar F. Hill
Aline Tarr

Inventor:
Paul Hannagan
by Macleod Calvert & Randall
Attorneys.

No. 790,254.

Patented May 16, 1905.

UNITED STATES PATENT OFFICE.

PAUL HANNAGAN, OF LAWRENCE, MASSACHUSETTS.

CESSPOOL OR CATCH-BASIN FOR SEWERS.

SPECIFICATION forming part of Letters Patent No. 790,254, dated May 16, 1905.

Application filed June 27, 1904. Serial No. 214,273.

*To all whom it may concern:*

Be it known that I, PAUL HANNAGAN, a citizen of the United States, residing at Lawrence, in the county of Essex, State of Massachusetts, have invented a certain new and useful Improvement in Cesspools or Catch-Basins for Sewers, of which the following is a specification, reference being had therein to the accompanying drawings.

My invention is illustrated by the accompanying drawings, in which—

Figure 1:
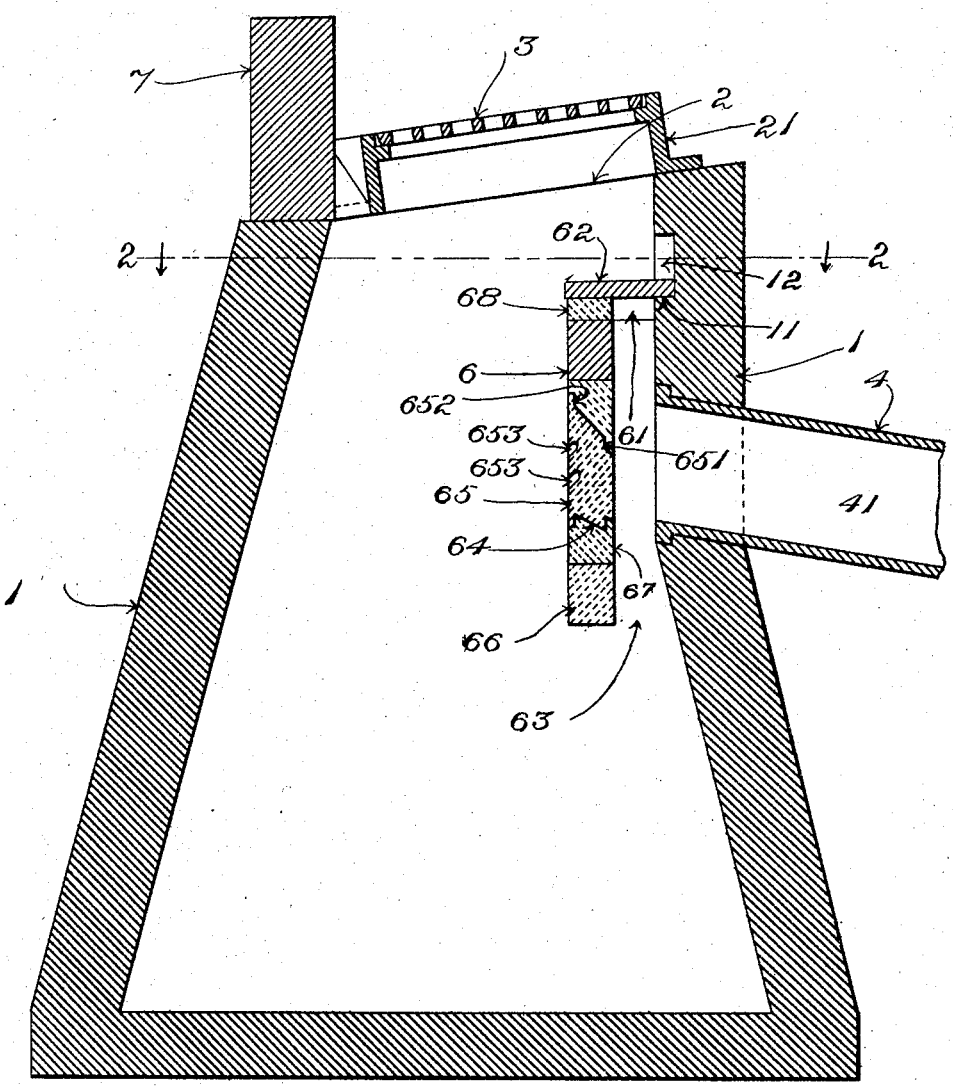
Figure 9:
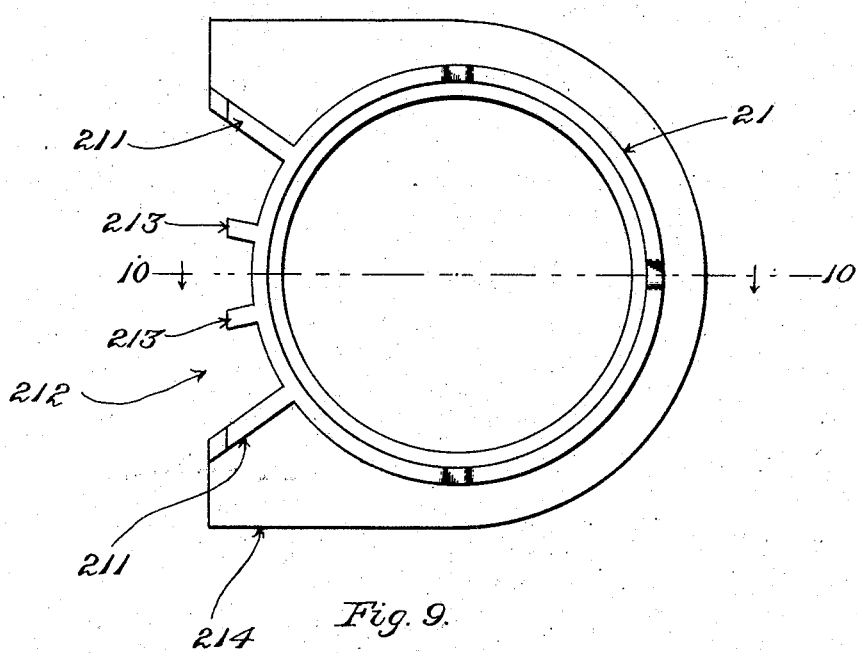
Figure 10:
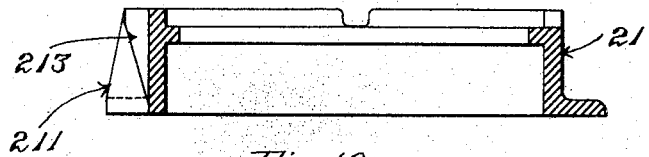

Figure 1 shows in vertical transverse section a cesspool or catch-basin embodying my invention. Fig. 2 is a view thereof in vertical transverse section on the dotted line 2 2 in Fig. 1. Fig. 3 is a view showing separately, on a slightly larger scale than Figs. 1 and 2, the block and plug to which reference is made hereinafter, the said block being in vertical section. Fig. 4 shows the plug separately in front elevation. Fig. 5 shows the plug in plan. Fig. 6 is a view similar to Fig. 3, but representing a plug which is rectangular in cross-section. Fig. 7 shows the rectangular plug in front elevation. Fig. 8 shows the same in plan. Fig. 9 shows the cover of the cesspool or catch-basin separately in plan. Fig. 10 is a view in vertical transverse section on the plane indicated by the dotted line 10 10, Fig. 9.

The shell or wall of a cesspool or catch-basin is represented at 1. The shape and construction of the cesspool or catch-basin are not material to the invention and may be varied as desired.

2 is the opening at the top of the cesspool or catch-basin.

21 is the cover at the top of the cesspool or catch-basin, and 3 is a grating that is removably applied to the opening of the said cover, the holes through the said grating permitting the inflow of water.

4 is a pipe having an end thereof set in an opening in one side of the shell or wall 1, the said pipe connecting in practice with a sewer, (not shown,) the passage 41 through the said pipe serving as an outlet for the outflow or discharge of water from the cesspool or catch-basin to the sewer.

It is customary to employ in connection with the outlet 41 a trap constituted by a wall, partition, or arch located in front of the said outlet at a short distance therefrom, the space between the said wall, partition, or arch and the adjacent wall 1 around the outlet being closed at the top and sides. The lower edge of the said wall, partition, or arch extends below the level of the bottom of the inner opening of the outlet, and the said space is open below to permit water to rise between the said wall, partition, or arch and the adjacent wall 1 in order that it may discharge through outlet 41. It happens occasionally in winter that the said space will fill with ice, frozen hard in place, in which event the ice requires to be broken away. In the case of the usual construction this is effected by means of a tool applied from below by a man who has descended within the cesspool or catch-basin for the purpose. At times also the space will become filled with leaves or other like material which must be pulled down from below. When sand or the like finds its way into the outlet-pipe 41 and more or less completely fills the passage of the latter, it can be removed only by breaking down the wall, partition, or arch, so as to obtain access to the passage of the said outlet-pipe through the breach thus made.

The objects of my invention are, in part, to afford access from above to the space adjacent the outlet for the removal of ice, accumulations of leaves, or the like and, if deemed desirable, without necessitating entrance of a workman into the cesspool or catch-basin; also, to afford ready access to the outlet for the purpose of clearing the passage thereof of any obstructing material which has entered into the same. The first portion of my invention consists in the improvements by which I attain these objects, and I will now proceed to explain the same in detail.

At 6 is represented a wall, partition, or the like extending across the interior of the cesspool or catch-basin in front of the opening of the outlet and joining at its sides with the wall or shell 1. This wall extends at its lower edge sufficiently below the level of the bottom of the outlet opening or passage 41 to answer, in connection with water contained in the cesspool or catch-basin and rising therein to the said level, the purposes of a seal. At the top of the said wall I form an opening 61 of sufficient dimensions to permit of the introduction of a chisel or rod for the purpose of chopping or breaking away ice formed or accumulated in the lower portion of the space between the wall 6 and the wall or shell 1 or for the purpose of pushing down an obstruction occupying the said portion and also to permit of the introduction of a hoe or the like for lifting and withdrawing leaves, &c., through the said opening at the top. This opening I provide with a movable cover 62, one edge of which may rest upon the top of the wall 6 and the other upon a seat or ledge 11, provided on the shell or wall 1 by making the horizontal recess 12 in the inner surface of the latter. The said cover is designed to serve for preventing the escape of sewer-gas through opening 61, and with this end in view suitable provision may be made for forming a tight joint between the said cover and its seat. For instance, the contacting surfaces may be thickly coated with lard-oil or other substance which will not harden on standing or act to immovably cement the cover to its seat. The removal of the cover will enable the desired tool to be introduced through the opening 61 for the performance of the required work. The opening at 63 at the lower end of the wall 6 may happen to become stopped up in some manner and the fact may go unobserved for some time. In order that in such event opportunity may still be afforded for escape of water through outlet-passage 41, I preferably form the cover 62 of a section of plank. When the water flowing into the cesspool or catch-basin fills the same so that its height reaches the cover 62, the latter will be floated from its seat or at least lifted, exposing the opening 61 and relieving further inflow by permitting the water to descend through such opening, and thus reach the outlet-passage 41. If it is desired to render the cover 62 readily accessible from the top of the cesspool or catch-basin, so as to enable the said cover to be removed from the said top without it being necessary for a man to enter and descend into the cesspool or catch-basin, the wall 6 may be built up to a convenient point capable of being reached from above after raising the grating 3, as in Fig. 1.

For the purpose of giving access when necessary directly to the outlet-passage 41 I form in the wall 6, preferably in line with the said outlet-passage, an opening, as 64, of suitable dimensions to permit a rod or hoe to be extended therethrough into the outlet-passage for the purpose of withdrawing sand or dirt occupying said outlet-passage or pushing it along into the sewer or for the purpose of enabling a stream of water from the nozzle of a hose to be directed into the said outlet-passage to wash dirt, sand, or the like along the passage into the sewer. This opening 64 is closed normally by means of a removable plug 65. (Shown separately in Figs. 4 and 5.) In order that the plug may tend to remain naturally in place, I utilize gravity by forming the opening 64 so that the portion of its wall on which the plug rests inclines downwardly and inwardly, as shown in Figs. 1 and 3, and I form the plug with a corresponding inclination at its under side. To the end that a tight fit between the plug 65 and the wall of the opening 64 may be secured all around I form the plug tapering in the direction of its length and shape the opening accordingly. To prevent the escape of gas around the plug, I form the latter at its inner end with a projecting shoulder 651, engaging with a corresponding shoulder with which the wall of the opening is formed, and at its outer end I provide the plug with a shoulder or flange 652 to engage with the adjacent portion of the support for the plug. In order to guard against injury to the said outer end— as, for instance, from a chisel or the like employed for the purpose of breaking or cutting away ice from the exposed surface of the wall or partition—I form a recess or rabbet around the outer end of the opening 64, within which the flange 652 is received. There is therefore no portion of the plug which projects from the surface of the wall so as to be exposed to injury from blows. Pressure of water against the exposed outer end of the plug tends to force the latter firmly against its seat.

The plug and the opening which receives the same may be either circular in cross-section, as in Figs. 3, 4, and 5, or angular, as in Figs. 6, 7, and 8.

For convenience in handling the plug, as in withdrawing the same from its seat or socket and setting it back in place, handholds of any convenient character may be provided. In the present instance the plug is shown formed with undercut recesses 653 653. These are adapted to receive the fingers of the workman in lifting or moving the plug. By means of a tool lowered through the opening 2 at the top of the cesspool or catch-basin and having its lower end inserted into one of the said recesses the plug may be withdrawn from the opening 64 or restored to place without it being necessary for a workman to descend into the cesspool or catch-basin.

In practice the walls 1 and 6 may be made of brick or cement, as preferred. The plug 65 and the portion of wall 6 to which the same is applied may be made of any material suitable for the purpose. I contemplate in some instances building the wall 6 upon a lower bar 66, of cement or other suitable material, having its ends anchored or tied in the wall or shell 1. Upon this I construct the wall 6. Above the bar 66 I employ a block 67, which may be composed of cement, having formed or molded therein the opening or seat 64 for the plug 65. The plug itself may be formed of cement molded to the required shape. At the top of wall 6 I may employ a top bar 68, of cement or other material, to constitute a finish for wall 6 and protect the latter from wear or injury. For some reasons I prefer to form the bottom and top bars 66 68, block 67, and plug 65 of cement, inasmuch as they may readily and cheaply be produced in the required shape and when composed of such material are strong and durable. When made of such material, the plug will remain free from tendency to stick immovably in the opening or seat therefor. The plug and block may be made of cast-iron or other metal, but with the drawback that rust or corrosion will have a tendency to cause the plug to become stuck in place.

Customarily the cover of a cesspool or catch-basin sets up closely at one side thereof against the outer face of the edge stone or curbing of a sidewalk, and usually the outer portion of the said edge stone is cut away or recessed to permit water which is unable to pass through the holes of grating 3 to flow over the edge of the cover and down through the recess of the edge stone into the cesspool or catch-basin. In some instances a cast-iron recessed frame is substituted for the portion of edge stone adjacent the cover or is set into the edge stone. An object of my invention is to obviate the necessity for recessing the edge stone or for employing the recessed frame aforesaid. To this end I construct the cover as represented most clearly in Figs. 9 and 10. In these figures the cover 21 is formed at the side thereof which is placed adjacent the edge stone with vertical flanges 211 211. The free edges of these vertical flanges are designed to rest against the plain outer face of the edge stone, and thereby determine the closeness of approach of the cover to the said face of the edge stone. Between the said flanges 211 211 the horizontal flange 214 of the cover is omitted, so that there is left a space 212, through which water may pour into the cesspool or catch-basin. By forming the cover with the vertical flanges 211 211, having between them the space or passage-way for the downpour of water, I am enabled to use an edge stone having a plain outer face and to obviate the labor and expense of forming a recess in the edge stone. I am also enabled to avoid the use of a cast-iron recessed frame, as heretofore proposed. The flanges 211 211 serve to confine the earth, sand, and paving-blocks or other surfacing material, which are placed around and against the exterior sides of the cover and prevent the same from passing into opening or space 212. In order that a vehicle-wheel traveling along closely adjacent the edge stone may not drop deeply into space 212, intermediate or bridging flanges or lugs 213 213 are formed upon the cover between the flanges 211 211. These support the rim of a wheel as the latter passes across the space 212. As is well understood, the cover occupies a slightly inclined or sloping position corresponding with the inclination of the surface of the side of the roadway to which the cover is applied. To compensate for this inclination of the cover, the flanges 211 211 are made slightly wider at the lower ends thereof than at their upper ends in order that the edges of the said flanges may have the necessary inclination to enable them to fit closely against the upright or vertical plain outer face of the edge stone.

I claim as my invention—

1. A cesspool or catch-basin for sewers, comprising an inclosing shell or wall having an outlet, an interior wall or partition extending transversely across the chamber inclosed by the said shell or wall and connected by its lateral portions with the said inclosing shell or wall, the chamber formed by said transverse interior wall or partition and its lateral portions being open both at its top and bottom, said interior wall or partition having its top edge below the top of said inclosing shell or wall and having an opening intermediate its top and bottom and in line with the outlet in said inclosing wall, a removable plug fitting said intermediate opening, and a cover applied to the upper open end of the said chamber and adapted to be floated from its seat on said wall or partition by water reaching the said seat.

2. A cesspool or catch-basin for sewers, comprising the inclosing shell or wall having the outlet, the substantially vertical interior wall or partition extending transversely across the chamber inclosed by the said shell or wall and connected by its lateral portions with the inclosing shell or wall, separated by a space from the latter, and having in line with the outlet an opening with inwardly-tapering walls which are downwardly and inwardly inclined at the bottom of said opening whereby the plug is held from forward displacement, and a removable plug correspondingly shaped and having a sliding fit within the said opening.

3. A cesspool or catch-basin for sewers, comprising the inclosing shell or wall having the outlet, the substantially vertical inner wall extending transversely within the said shell or wall, and having in line with the outlet the opening having the rabbet around its outer end, inwardly-tapering walls downwardly and inwardly inclined at the bottom whereby the plug is held from forward displacement, and an interior shoulder, and a removable plug correspondingly shaped to fit within the said opening, having a flange which enters said rabbet, and making contact by its inner portion with said shoulder.

4. In a cesspool or catch-basin for sewers, in combination, the inclosing shell or wall having the outlet, the interior wall or partition forming a trap for the said outlet and having in line with the outlet an inwardly-tapered opening having downwardly and inwardly inclined walls, and a removable tapered plug fitting the said opening.

5. A cesspool or catch-basin for sewers, comprising the inclosing shell or wall having the outlet, the inner wall extending transversely within the said shell or wall and having set therein the substantially vertical block having the opening with inwardly-tapering walls downwardly and inwardly inclined at the bottom of the opening whereby the plug is held from forward displacement, and the removable plug correspondingly shaped, having a sliding fit within the opening in the block and hooking over the lower portion of said walls to retain the plug in place.

6. A cesspool or catch-basin for sewers, having a lateral outlet and comprising an inclosing shell or wall, and an inner division and reinforcing wall or partition united at its side edges with the said inclosing shell or wall, said division and reinforcing wall comprising a wall sustaining and reinforcing bar at the lower edge thereof, a wall portion proper carried by said sustaining-bar, and a wall-protecting bar at the upper edge of the wall portion proper.

7. A cesspool or catch-basin for sewers comprising an inclosing shell or wall having an outlet, and an inner division and reinforcing wall or partition united at its side edges with the said inclosing shell or wall, said division-wall comprising a wall sustaining and reinforcing bar at the lower edge thereof, a wall portion proper carried by said sustaining-bar, and a protecting-bar at the upper edge of said wall portion, said division-wall having an opening therethrough in line with the outlet in said inclosing shell or wall, and a removable plug fitting the opening in said division-wall.

8. In a cesspool or catch-basin for sewers, in combination, the inclosing shell or wall having the outlet, the inner wall forming a trap for the said outlet and having the supporting and reinforcing bar at the lower edge thereof, the said inner wall having built therein the block having the opening in line with the outlet, the said opening having the inclined and tapering walls, and the removable plug shaped to fit the opening in the block.

9. In a cesspool or catch-basin for sewers, in combination, the inclosing shell or wall having the outlet, the inner wall forming a trap for said outlet and having the lower edge thereof constituted of the cement bar, the said inner wall having built therein the cement block formed in line with the said outlet with the tapered opening having the inclined walls, and the cement plug shaped to fit the opening in the block.

10. The combination with an edge stone having a plain outer face, of the cover making contact at one edge thereof with the said plain outer face of the edge stone and having alongside the said face the space for the downflow of water.

11. The combination with an edge stone having a plain outer face; of the cover having the opposite flanges projecting therefrom and making contact with the said face, and having between the said flanges the space for the downflow of water.

12. The combination with an edge stone having a plain outer face, of the cover having the opposite flanges projecting therefrom and making contact with the said face, having between the said flanges the space for the downflow of water, and provided with the intermediate or bridging lugs or flanges.

13. The combination with an edge stone having a plain outer face, of the cover having the opposite flanges projecting therefrom and provided with the inclined outer edges making contact with the said face, and having between the said flanges the space for the downflow of water.

In testimony whereof I affix my signature in presence of two witnesses.

PAUL HANNAGAN.

Witnesses:
 CHAS. F. RANDALL,
 EDITH J. ANDERSON.